(12) United States Patent
Ishikawa et al.

(10) Patent No.: US 7,074,148 B2
(45) Date of Patent: Jul. 11, 2006

(54) HYDRAULIC CONTROLLER OF POWER TRANSMISSION DEVICE

(75) Inventors: Tomoaki Ishikawa, Saitama (JP); Shigeji Nakano, Saitama (JP); Kazunori Fujishima, Saitama (JP); Masaaki Yamaguchi, Saitama (JP); Tsuyoshi Fujita, Saitama (JP); Takao Ueno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 10/913,395

(22) Filed: Aug. 9, 2004

(65) Prior Publication Data

US 2005/0085340 A1    Apr. 21, 2005

(30) Foreign Application Priority Data

Oct. 16, 2003    (JP)    ............................. 2003-357036

(51) Int. Cl.
*F16H 47/08*    (2006.01)

(52) U.S. Cl. .......................................... 475/65; 475/70

(58) Field of Classification Search .................. 475/59, 475/70, 216, 210, 65; 477/38, 44
See application file for complete search history.

(56) References Cited

U.S. PATENT DOCUMENTS

| | | | | |
|---|---|---|---|---|
| 5,063,815 A | * | 11/1991 | Oshidari | 477/38 |
| 5,119,698 A | * | 6/1992 | Sugaya et al. | 477/39 |
| 5,188,007 A | * | 2/1993 | Hattori et al. | 474/28 |
| 6,503,169 B1 | * | 1/2003 | Nakano et al. | 477/62 |

FOREIGN PATENT DOCUMENTS

JP    03-144160    6/1991

* cited by examiner

*Primary Examiner*—Dirk Wright
(74) *Attorney, Agent, or Firm*—Arent Fox PLLC (57) ABSTRACT

A hydraulic controller of a power transmission device is equipped with a transmission for changing a rotation speed of motor power input from a motor and outputting the motor power; a forward/backward change-over mechanism provided between an input shaft, where the motor power of the motor is input and the transmission; and a torque converter having a direct coupling mechanism for transmitting the motor power between an output shaft and the input shaft of the motor; a solenoid valve for adjusting an original pressure and generating a control pressure; and a change-over element for changing over a hydraulic pressure supplied to the forward/backward change-over mechanism so as to become a low pressure during deceleration driving when the direct coupling mechanism is controlled by the solenoid valve, wherein any one of engagement states of the forward/backward change-over mechanism and the direct coupling mechanism is controlled by the control pressure.

1 Claim, 6 Drawing Sheets

| Mode | First Solenoid Valve (12) | Second Solenoid Valve (13) | Lock-up Clutch Mechanism (5) | Hydraulic Pressure of Forward/Backward Change-over Mechanism (6) | Driving State |
|---|---|---|---|---|---|
| 1 | OFF | ON | OFF | CPC | In-gear/Idling/Start |
| 2 | ON | ON | OFF | CR | Acceleration/Kick-down |
| 3 | ON | OFF | ON | CR | Normal Driving |
| 4 | OFF | OFF | ON | CL | Deceleration |

FIG.3

HYDRAULIC CONTROLLER OF POWER TRANSMISSION DEVICE

BACKGROUND OF THE INVENTION

1. Field of the Invention

The present invention relates to a hydraulic controller of a power transmission device mounted on an automobile.

2. Description of the Related Art

Conventionally, a power transmission device mounted on an automobile transmits motor power of a motor, which is input, for example, through a torque converter, to drive wheels through a forward/backward change-over mechanism and a belt type continuously variable transmission. In such the power transmission device it is necessary to control an engagement capacity of friction engagement elements (a clutch for a forward move and a brake for a backward move (hereinafter simply referred to as "forward clutch" and "backward brake," respectively) for configuring the forward/backward change-over mechanism in order to prevent an excessive torque from being input to a V belt; alleviate a transmission shock generated at the time of a start from a neutral, a forward/backward change-over, or the like; or to prevent a slip of the V belt at the time of a lock of the drive wheels. In the engagement capacity control of such the forward/backward change-over mechanism a linear solenoid valve (hydraulic pressure adjustment electromagnetic valve for the forward/backward change-over mechanism) is used to control a hydraulic pressure supplied to the mechanism (for example, see line 7 of a left column to line 5 the right column of page 3 and FIG. 1 in Japanese Patent Laid-Open Publication Hei 3-144160).

In addition, also in a lock-up clutch mechanism (direct coupling mechanism) of the torque converter, it is preferable that optimum engagement capacity control depending on a vehicle speed and the like is implemented, and even in a case of such the purpose the linear solenoid valve (hydraulic pressure adjustment valve) is used.

However, the linear solenoid valve is generally expensive, and there is a problem that cost extremely becomes high in the configuration with the solenoid valves as many as two as described above.

Then in the hydraulic controller of the power transmission device there is a problem that a layout thereof is restricted in order to place the solenoid valves and a space has to be largely ensured.

In addition, a high hydraulic pressure is always supplied to the friction engagement elements of the conventional forward/backward change-over mechanism and thus they are completely engaged. Therefore, because when a strong braking is implemented during an engine brake, a drastic load is given to the V belt of the transmission due to the complete engagement of the forward clutch, the V belt slips in some case.

Consequently, is strongly requested a hydraulic controller of a power transmission device, which controls the forward/backward change-over mechanism and the torque converter with one electromagnetic valve and prevents the slip of the V belt of the transmission.

SUMMARY OF THE INVENTION

In order to solve the problems described above, a hydraulic controller of a power transmission device of a first aspect of the present invention is the controller that comprises a transmission for changing a rotation speed of motor power input from a motor and outputting the motor power; a forward/backward change-over mechanism provided between an input shaft, where the motor power of the motor is input, and the transmission; a torque converter having a direct coupling mechanism for transmitting the rotation speed between an output shaft and the input shaft of the motor; a solenoid valve for adjusting an original pressure and generating a control pressure; and a change-over element for changing over a hydraulic pressure supplied to the forward/backward change-over mechanism so as to become a low pressure during deceleration driving when the direct coupling mechanism is controlled by the solenoid valve, wherein any one of engagement states of the forward/backward change-over mechanism and the direct coupling mechanism is controlled by the control pressure.

In accordance with the first aspect of the present invention, because when controlling the direct coupling mechanism by the solenoid valve, the hydraulic controller of the power transmission device comprises the change-over element for changing over the hydraulic pressure supplied to the forward/backward change-over mechanism so as to become the low pressure at the time of the deceleration driving, the hydraulic controller of the power transmission device can lessen the hydraulic pressure supplied to the forward/backward change-over mechanism. Therefore, the forward/backward change-over mechanism can loosen an engagement state. Then, for example, when a strong braking is implemented during an engine brake, a load is given to the transmission due to a transmission shock. Because the hydraulic pressure supplied to the forward/backward change-over mechanism is lessened and thereby a forward clutch of the forward/backward change-over mechanism slips, the load can alleviate a load of a V belt. Therefore, the V belt is prevented from being damaged due to the load and thus can be protected. In addition, any of forward clutch and backward brake f of the forward/backward change-over mechanism is engaged in a loose state and slips, thereby the slip and transmission shock of the transmission are prevented, and the power transmission of the motor can be made smoother by the slip. Accordingly, the load on the V belt is reduced and a life thereof can be made longer.

DESCRIPTION OF THE PREFERRED EMBODIMENTS

First will be described a hydraulic controller of a power transmission device related to an embodiment of the present invention, referring to FIGS. 1 to 6.

Figure 1:
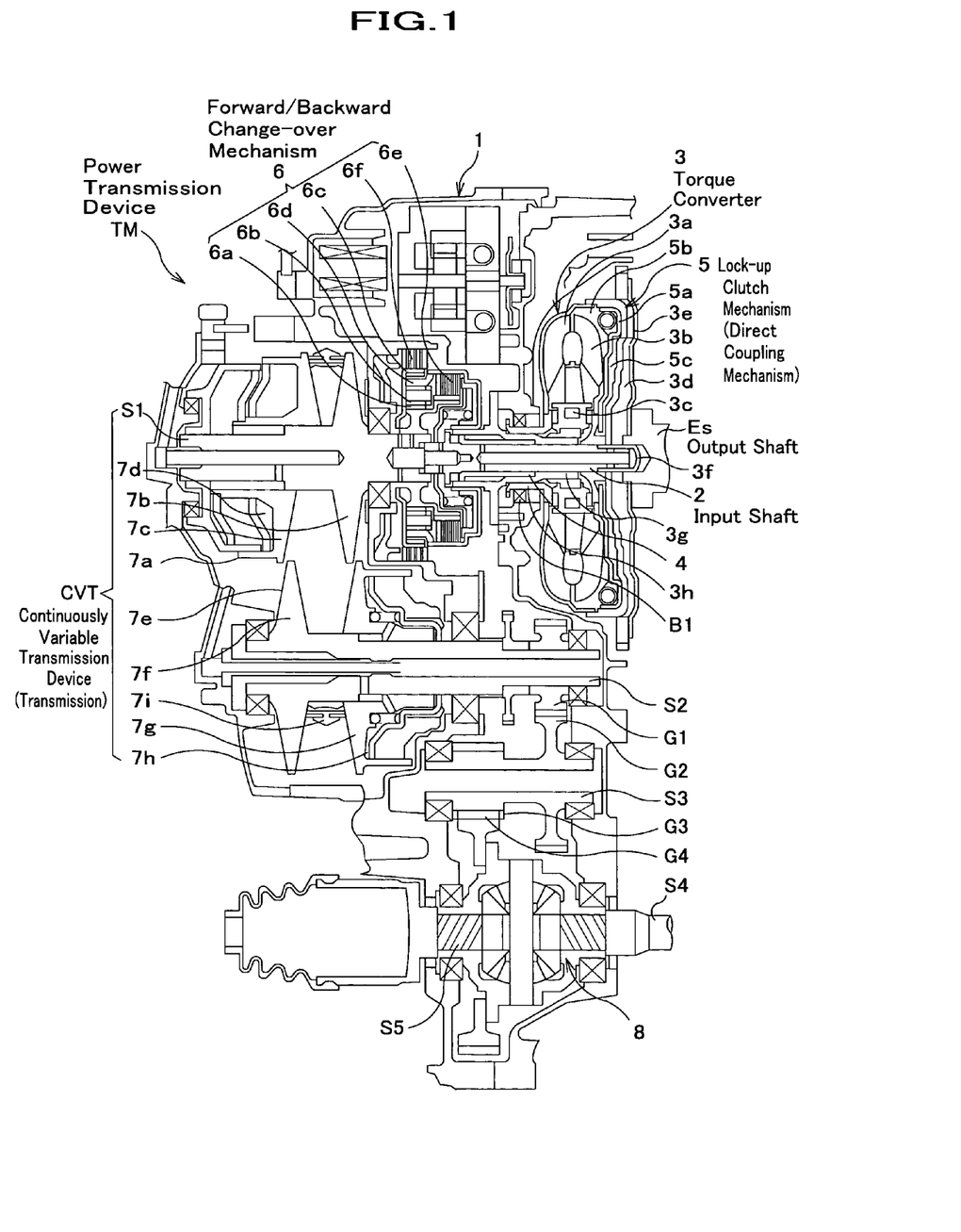
FIG. 1 is a drawing showing a hydraulic controller of a power transmission device related to an embodiment of the present invention and a sectional drawing of the power transmission device.

As shown in FIG. 1, a power transmission device TM comprises a continuously variable transmission device CVT for changing a rotation speed, which is input from an output shaft Es of an engine (not shown), and outputting it; and a torque converter 3, which is provided between the engine (not shown) and the continuously variable transmission device CVT, for transmitting the motor power. In the power transmission device TM the torque converter 3 and a forward/backward change-over mechanism 6 are placed in parallel on a primary shaft S1 within a transmission case 1.

The continuously variable transmission device CVT described later is housed within the transmission case 1 and freely rotatably supported by an input shaft 2, the primary shaft S1, a secondary shaft S2, a counter shaft S3, and bearings whose respective left/right axle shafts S4 and S5 are attached to the transmission case 1.

The input shaft 2, the primary shaft S1, and the output shaft Es of the engine (not shown) are arranged on a same axis by a coupling mechanism and the like. To the input shaft 2 is input the motor power from the engine (not shown) through the torque converter 3. The secondary shaft S2 is placed at a position, which is separated by a predetermined distance, in parallel to the input shaft 2 and the primary shaft S1.

The secondary shaft S2 is placed at a position, which is separated by a predetermined distance, in parallel to the primary shaft S1.

The counter shaft S3 is placed at a position, which is separated by a predetermined distance, in parallel to the secondary shaft S2.

The left/right axle shafts S4 and S5 are arranged on a same axis and placed at positions, which are separated by a predetermined distance, in parallel to the counter shaft S3.

The torque converter 3 comprises a lock-up clutch mechanism 5 for connecting/breaking the output shaft Es and a turbine runner 3b. The torque converter 3 itself is configured of a pump impellor 3a, the turbine runner 3b, and a stator 3c.

The pump impellor 3a unifies with a converter cover 3d for covering a periphery thereof and is freely rotatably supported at the output shaft Es of the engine through a bearing B1 and through a drive plate 3e, where a starter gear (not shown) is attached.

The turbine runner 3b is connected to the input shaft 2 through a turbine hub 3f.

The stator 3c is attached to a stator shaft 4 through a one-way clutch 3g.

The lock-up clutch mechanism 5 is provided within the torque converter 3 and is designed so as to push a lock-up clutch piston 5a attached to the turbine hub 3f onto an inner surface of the converter cover 3d, thereby engage them, and be able to directly transmit the motor power from the engine (not shown) to the input shaft 2.

The lock-up clutch piston 5a is actuated by supplying/discharging hydraulic oil to and from a turbine-side oil chamber 5b and a cover-side oil chamber 5c that are formed by a space within the torque converter 3 being comparted by the lock-up clutch piston 5a.

The motor power of the input shaft 2 is transmitted to the primary shaft S1 through the forward/backward change-over mechanism 6. The forward/backward change-over mechanism 6 comprises a sun gear 6a fixed on the primary shaft S1, a plurality of planetary gears 6b circumscribing the sun gear 6a, a carrier 6c for freely rotatably supporting the planetary gears 6b, and a ring gear 6d that is fixed on the input shaft 2 and inscribes the planetary gears 6b.

The primary shaft S1 and the ring gear 6d are designed to be able to engage by actuating a forward clutch 6e by a hydraulic pressure.

The carrier 6c and the transmission case 1 are designed to be able to engage by actuating a backward brake 6f by a hydraulic pressure.

When engaging the forward clutch 6e and releasing the backward brake 6f, the input shaft 2, ring gear 6d, planetary gears 6b, sun gear 6a, and carrier 6c are designed to rotate as one and so that the primary shaft S1 rotates in a same direction as the input shaft 2.

When releasing the forward clutch 6e and engaging the backward brake 6f, the rotation of the input shaft 2 is designed to be transmitted to the sun gear 6a through the planetary gears 6b whose rotation shafts are fixed by the carrier 6c and so that the primary shaft S1 rotates in the reverse direction for the input shaft 2.

The motor power of the primary shaft S1 is designed to be transmitted to the secondary shaft S2 through the continuously variable transmission device CVT. The continuously variable transmission device CVT comprises a drive-side pulley 7a provided on the primary shaft S1, a driven-side pulley 7e provided on the secondary shaft S2, and a V belt 7i hung across between the drive-side pulley 7a and the driven-side pulley 7e.

The drive-side pulley 7a comprises a fixation pulley half body 7b, which is fixed on the primary shaft S1, and a movable pulley half body 7c, which is freely slidably provided in an axial direction on the primary shaft S1 facing the fixation pulley half body 7b. The drive-side pulley 7a is designed so as to move the movable pulley half body 7c by supplying/discharging hydraulic oil to and from within a cylinder chamber 7d and to thereby be able to change a distance (pulley width) between the fixation pulley half body 7b and the movable pulley half body 7c.

The driven-side pulley 7e comprises a fixation pulley half body 7f, which is fixed on the secondary shaft S2, and a movable pulley half body 7g, which is freely slidably provided in an axial direction on the secondary shaft S2 facing the fixation pulley half body 7f. The driven-side pulley 7e is designed so as to move the movable pulley half body 7g by supplying/discharging hydraulic oil to and from within a cylinder chamber 7h and to thereby be able to change a distance (pulley width) between the fixation pulley half body 7f and the movable pulley half body 7g.

And the drive-side pulley 7a and the driven-side pulley 7e are designed so as to change a winding-across radius of the V belt 7i by adjusting the pulley widths and to thereby be able to steplessly change a transmission ratio between the primary shaft S1 and the secondary shaft S2.

The motor power input to the secondary shaft S2 is designed to be transmitted to the counter shaft S3 through a gear G1 and a gear G2 and further to a differential mechanism 8 through a final drive gear G3 and a final driven gear G4. The differential mechanism 8 is designed to divide the input motor power and transmit it to left/right axle shafts S4 and S5, and so that the axle shafts S4 and S5 drive left/right wheels (not shown) provided at respective ends.

Thus in the power transmission device TM the motor power of the engine (not shown), which is input to the input shaft 2 through the torque converter 3, is designed to be transmitted to front wheels (not shown) through the forward/backward change-over mechanism 6 and the continuously variable transmission device CVT and so that the vehicle is driven. And a change-over of a travel direction of the vehicle is implemented by an actuation of the forward/backward change-over mechanism 6. Meanwhile, the power transmission device TM can steplessly obtain an arbitrary transmission ratio by actuating the continuously variable transmission device CVT.

Next will be described a hydraulic circuit diagram in a hydraulic controller of the power transmission device TM, referring to FIG. 3.

Figure 3:
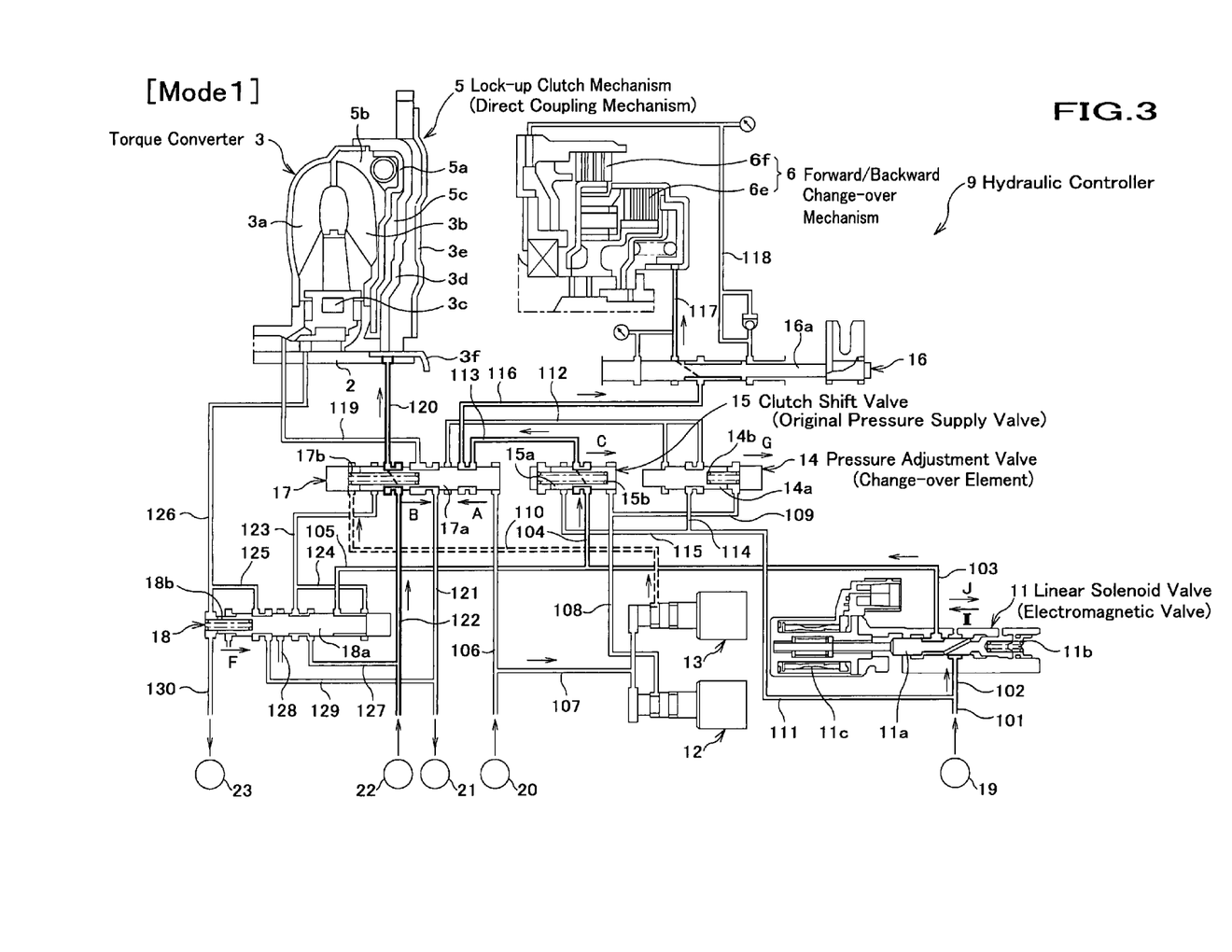
FIG. 3 is a drawing showing a hydraulic controller of a power transmission device related to an embodiment of the present invention and a hydraulic circuit diagram showing a state of a mode 1.

As shown in FIG. 3, a hydraulic controller 9 is a controller for controlling a hydraulic pressure for adjusting a clutch engagement capacity of the lock-up clutch mechanism 5 and forward/backward change-over mechanism 6 of the power transmission device TM. The hydraulic controller 9 comprises the torque converter 3, the lock-up clutch mechanism 5, the forward clutch 6e, the backward brake 6f, a linear solenoid valve 11, a first solenoid valve 12, a second solenoid valve 13, a pressure adjustment valve 14, a clutch shift valve 15, a manual valve 16, a lock-up shift valve 17, a lock-up control valve 18, a hydraulic pump (not shown), a regulator valve (not shown), a valve group for pulley control (not shown), an electric control unit (not shown), and the like.

Meanwhile, actuation of the linear solenoid valve 11 and a plurality of solenoid valves (not shown) included in the first and second solenoid valves 12 and 13 is controlled by the electric control unit (not shown), based on information signals such as an engine rotation speed, a throttle opening, a vehicle speed, and a hydraulic oil temperature.

The linear solenoid valve 11 is an electromagnetic valve for a hydraulic pressure change-over for adjusting an engagement state of the lock-up clutch mechanism 5 by adjusting an extraction amount of hydraulic oil within the torque converter 3. The linear solenoid valve 11 comprises a spool 11a movable forward/backward within a housing thereof, a spring 11b for always energizing the spool 11a in a left direction of an arrow mark I, and a solenoid 11c provided around the spool 11a.

The spool 11a is designed to move forward/backward by attraction force of the solenoid 11c, which is actuated by an electric signal from the electric control unit (not shown), adjust an original pressure (CR) within an oil passage 102 branched from an oil passage 101, thereby produce a control pressure (CPC), and supply it within an oil passage 103.

The oil passage 102 is connected to the hydraulic pump (not shown) through the oil passage 101 and an original pressure valve 19.

The oil passage 103 is branched into an oil passage 104 and an oil passage 105, the oil passage 104 is connected to the clutch shift valve 15, and the oil passage 105 is connected to the lock-up control valve 18. The oil passage 105 adjusts hydraulic oil, which flows in an oil passage 128 from the lock-up shift valve 17 through an oil passage 123 and the lock-up control valve 18, by the control pressure (CPC) from the linear solenoid valve 11.

Each of the first and second solenoid valves 12 and 13 comprises a spool (not shown), a spring (not shown), and a solenoid (not shown) same as the linear solenoid valve 11 and is actuated by an electric signal from the electric control unit (not shown).

On the first solenoid valve 12 an original pressure from a modulator valve 20 acts through oil passages 106 and 107, and the first solenoid valve 12 is designed to be actuated by an electric signal from the electric control unit (not shown), send a signal pressure of ON to the clutch shift valve 15 and the pressure adjustment valve 14 through oil passages 108 and 109, and so that the original pressure (CR) acts on the clutch shift valve 15 and the pressure adjustment valve 14.

On the second solenoid valve 13 the original pressure from the modulator valve 20 acts through the oil passages 106 and 107, and the second solenoid valve 13 is designed to be actuated by an electric signal from the electric control unit (not shown), send a signal pressure of ON to the lock-up shift valve 17 through an oil passage 110, and so that an actuation pressure for actuating the torque converter 3 is supplied to the lock-up shift valve 17.

To the pressure adjustment valve 14 are connected the oil passage 109 communicated with the first solenoid valve 12, an oil passage 114 communicated with the original pressure valve 19, and an oil passage 112 communicated with the lock-up shift valve 17. When the first solenoid valve 12 is OFF and the signal pressure of ON is not loaded in the oil passage 109, the pressure adjustment valve 14 is a valve for converting the original pressure (CR) of a high pressure (for example, 16 kgf/cm² (1.6 MPa)) of oil passages 111 and 114 branched from the oil passage 101 from the original pressure valve 19 to a low pressure (for example, 4 to 16 kgf/cm² (0.4 to 1.6 MPa) with elasticity of the spring 14b and an oil pressure of the oil passages 111 and 114 and supplying a hydraulic pressure to the lock-up shift valve 17 from the oil passage 112. On the other hand, when the first solenoid valve 12 is ON and the signal pressure of ON is loaded in the oil passage 109, the pressure adjustment valve 14 is a change-over valve for pushing the original pressure (CR) of the high pressure (for example, 16 kgf/cm² (1.6 MPa)) of the oil passage 114 with the spring 14b and the signal pressure of the oil passage 109, thereby not lowering the original pressure (CR), and supplying the hydraulic pressure to the lock-up shift valve 17 from the oil passage 112 in the high pressure state as it is. The pressure adjustment valve 14 comprises a spool 14a provided movably forward/backward within a housing thereof, a spring 14b for always energizing the spool 14a in a right direction of an arrow mark G and adjusting the hydraulic pressure of the oil passage 114 to the low pressure when the signal pressure is loaded in the oil passage 109.

The clutch shift valve (original pressure supply valve) 15 comprises a spool 15a provided movably forward/backward within a housing thereof and a spring 15b for always energizing the spool 15a in a right direction of an arrow mark C. To the clutch shift valve 15 is connected each of the oil passage 108 connected to the first solenoid valve 12, the oil passage 104 continuing to the oil passage 103 connected to the linear solenoid valve 11, the oil passage 111 and an oil passage 115 that continue to the oil passage 101 connected to the original pressure valve 19, and an oil passage 113 connected to the lock-up shift valve 17.

When the first solenoid valve 12 becomes ON, the clutch shift valve 15 is designed to be actuated by the signal pressure of ON output from the first solenoid valve 12. When the clutch shift valve 15 is in an ON state, it is designed so as to connect the oil passages 111 and 115, which continues to the oil passage 101 connected to the original pressure valve 19, to the oil passage 113 connected to the lock-up shift valve 17.

On the other hand, when the first solenoid valve 12 becomes OFF and the pressure signal of OFF acts on the clutch shift valve 15, it is designed so as to connect the oil passages 103 and 104 connected to the linear solenoid valve 11 to the oil passage 113 connected to the lock-up shift valve 17.

The manual valve 16 is a valve for controlling the forward/backward change-over mechanism 6 and comprises a spool 16a provided movably forward/backward within a housing thereof. The spool 16a is designed to be actuated by a manual shift lever (not shown) at a driver seat. The manual valve 16 is designed so that: the spool 16a is moved to a left side and thereby an oil passage 116 connects to an oil passage 117 connected to the forward clutch 6e when the vehicle is moved forward; and the spool 16a is moved to a right side and the oil passage 116 connects to an oil passage 118 connected to the backward brake 6f when the vehicle is moved backward.

The lock-up shift valve 17 is a valve for controlling a volume and flow direction of hydraulic oil sent to the forward/backward change-over mechanism 6 and the torque converter 3 and comprises a spool 17a provided movably forward/backward within a housing thereof and a spring 17b for always energizing the spool 17a in a left direction of an arrow mark B.

To the lock-up shift valve 17 is connected each of the oil passage 106 connected to a modulator valve 20, the oil passage 110 connected to the second solenoid valve 13, the oil passage 113 connected to the clutch shift valve 15, the oil passage 112 connected to the pressure adjustment valve 14, the oil passage 116 connected to the manual valve 16, an oil passage 119 connected to an input side of the torque converter 3, an oil passage 120 connected to an output side of the torque converter 3, an oil passage 121 connected to an oil cooler 21, an oil passage 122 connected to the hydraulic pump (not shown) through a regulator valve 22 and a receiver valve (not shown), and an oil passage 123 connected to the lock-up control valve 18.

The spool 17a is designed to be actuated by transmitting the signal pressure of ON, which is output when the second solenoid valve 13 becomes ON, through the oil passage 110 connected to the second solenoid valve 13.

When the signal pressure of ON of the second solenoid valve 13 acts on the spool 17a, it is located at an ON position shifted in the right direction of the arrow mark B, shuts off the oil passage 123 connected to the lock-up control valve 18 from the oil passage 119 connected to the torque converter 3, and connects the oil passage 122, which is connected to the regulator valve 22, to the oil passage 120 connected to the lock-up clutch mechanism 5.

On the other hand, because when the second solenoid valve 13 is OFF, the signal pressure of ON does not act on the spool 17a it is located at an OFF position shifted in a left direction of an arrow mark A. At this time, in the lock-up shift valve 17 the oil passage 122, where hydraulic oil is supplied from the regulator valve 22, communicates with the oil passage 120 connected to the cover-side oil chamber 5c of the lock-up clutch mechanism 5, and the oil passage 119, which is connected to the turbine-side oil chamber 5b of the lock-up clutch mechanism 5, communicates with the oil passage 121 connected to the oil cooler 21.

In addition, to the spool 17a is connected to the oil passage 106, which is branched from the oil passage 107 connected to the first solenoid valve 12. The spool 17a is designed to be acted by supplying the signal pressure of ON, which is output when the first solenoid valve 12 becomes ON, from the oil passage 113 through the oil passage 108 and the clutch shift valve 15.

When the signal pressure of ON from the clutch shift valve 15 acts on the spool 17a it is located at the ON position shifted in the right direction of the arrow mark B and the oil passage 113 connected to the clutch shift valve 15 communicates with the oil passage 116 connected to the manual valve 16.

Because when a signal pressure of OFF of the first solenoid valve 12 acts on the clutch shift valve 15, the signal pressure of ON does not act on the spool 17a the lock-up shift valve 17 is located at the OFF position shifted in the left direction of the arrow mark A, resisting the spring 17b due to an hydraulic pressure of the oil passage 106. At this time the original pressure from the original pressure valve 19 is supplied to the pressure adjustment valve 14 through the oil passages 101 and 111, and an actuation pressure of the low pressure is supplied to the spool 17a from the pressure adjustment valve 14 through the oil passage 112 and then on the forward clutch 6e through the oil passage 116 and the manual valve 16.

The lock-up control valve 18 comprises a spool 18a provided movably forward/backward within a housing thereof and a spring 18b for always energizing in a right direction of an arrow mark F. To the lock-up control valve 18 is connected each of the oil passage 105, the oil passage 123, and an oil passage 124, an oil passage 125, an oil passage 126, an oil passage 127, an oil passage 128, an oil passage 129, and an oil passage 130. The lock-up control valve 18 moves the spool 18a by a lowered control pressure from the oil passage 105 connected to the linear solenoid valve 11 and adjusts an extraction amount of hydraulic oil of the torque converter 3, which passes the lock-up control valve 18 from the oil passage 123 and flows in the oil passage 128. The lock-up clutch mechanism 5 is designed so that an engagement capacity control pressure is converted in accordance with the adjustment of the extraction amount of the hydraulic oil by the lock-up control valve 18.

The oil passage 125 is a branch passage of the oil passage 126. The oil passage 126 is connected to a stator 3c side of the torque converter 3, and piping of the oil passage 125 is designed so that hydraulic oil within the stator 3c passes a torque converter check valve 23 from the oil passage 130 through the lock-up control valve 18 and is discharged into the oil cooler 21.

The oil passage 127 is designed so as to be branched from the oil passage 122 connected to the regulator valve 22 and send the original pressure (CR) to the lock-up control valve 18.

The oil passage 129 is a branch passage from the oil passage 121 and is designed so that hydraulic oil within the lock-up control valve 18 is discharged into the oil cooler 21 through the oil passage 129.

Next will be described an operation of a hydraulic controller of a power transmission device related to the embodiment of the present invention, referring to FIGS. 2 to 6.

Figure 2:
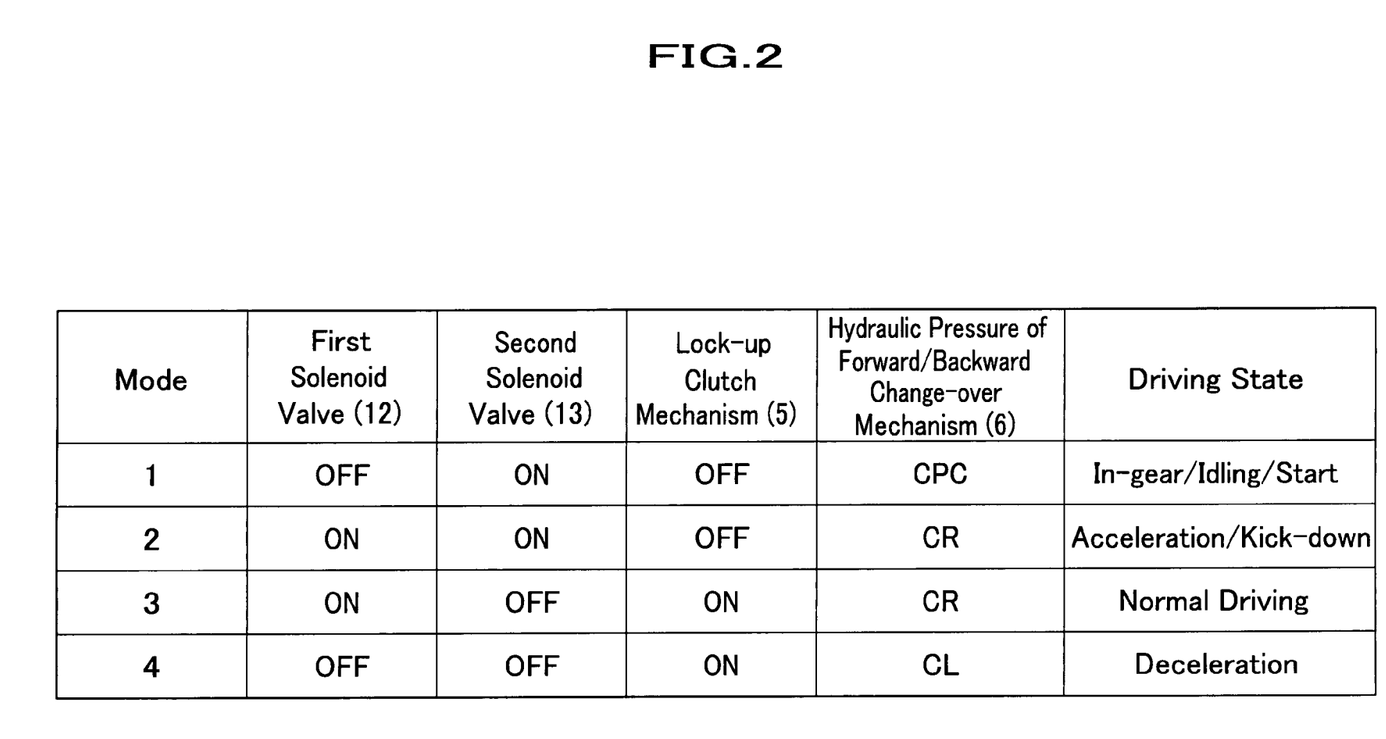
FIG. 2 is a table showing an actuation state of a forward/backward change-over mechanism in a hydraulic controller of a power transmission device related to an embodiment of the present invention.

First, an operation of a mode 1 will be described, referring to FIGS. 2 and 3.

In the mode 1 a driving state of a vehicle is in a throttle-totally-closed state and in any state of an in-gear, an idling, and a start. In the mode 1, as shown in FIG. 2, the first solenoid valve 12 is OFF, the second solenoid valve 13 is ON, the lock-up clutch mechanism 5 is OFF, and the control pressure (CPC) from the linear solenoid valve 11 is in a state of being supplied to the forward/backward change-over mechanism 6.

In other words, in the mode 1, as shown in FIG. 3, the first solenoid valve 12 is OFF and thereby the signal pressure of ON is not supplied to the pressure adjustment valve 14 and the clutch shift valve 15 from the first solenoid valve 12, passing the oil passages 108 and 109.

Because the second solenoid valve 13 is ON, the signal pressure of ON is supplied to the lock-up shift valve 17 from the oil passage 110.

Therefore, an actuation pressure supplied from the regulator valve 22 passes the lock-up shift valve 17 from the oil passage 122, is supplied to the cover-side oil chamber 5c from the oil passage 120, the lock-up clutch piston 5a is pushed and thereby separated from a converter cover 3d, and the lock-up clutch mechanism 5 is in an OFF state of being released. At this time the torque converter 3 becomes a normal functional state.

Then a current is passed to the linear solenoid valve 11 from the electric control unit (not shown), and on the forward/backward change-over mechanism 6 is loaded the control pressure (CPC) from the linear solenoid valve 11 through the oil passages 103 and 104, the clutch shift valve 15, the oil passage 113, the lock-up shift valve 17, the oil passage 116, and the manual valve 16. In this state, for example, when a shift lever (not shown) is in a forward direction such as a D range, the control pressure (CPC) supplied to the manual valve 16 is supplied to the oil passage 117 coupled with the forward clutch 6e, a smooth in-gear control is implemented, and the idling and start of the vehicle can be made.

Next will be described a mode 2, referring FIGS. 2 and 4.

Figure 4:
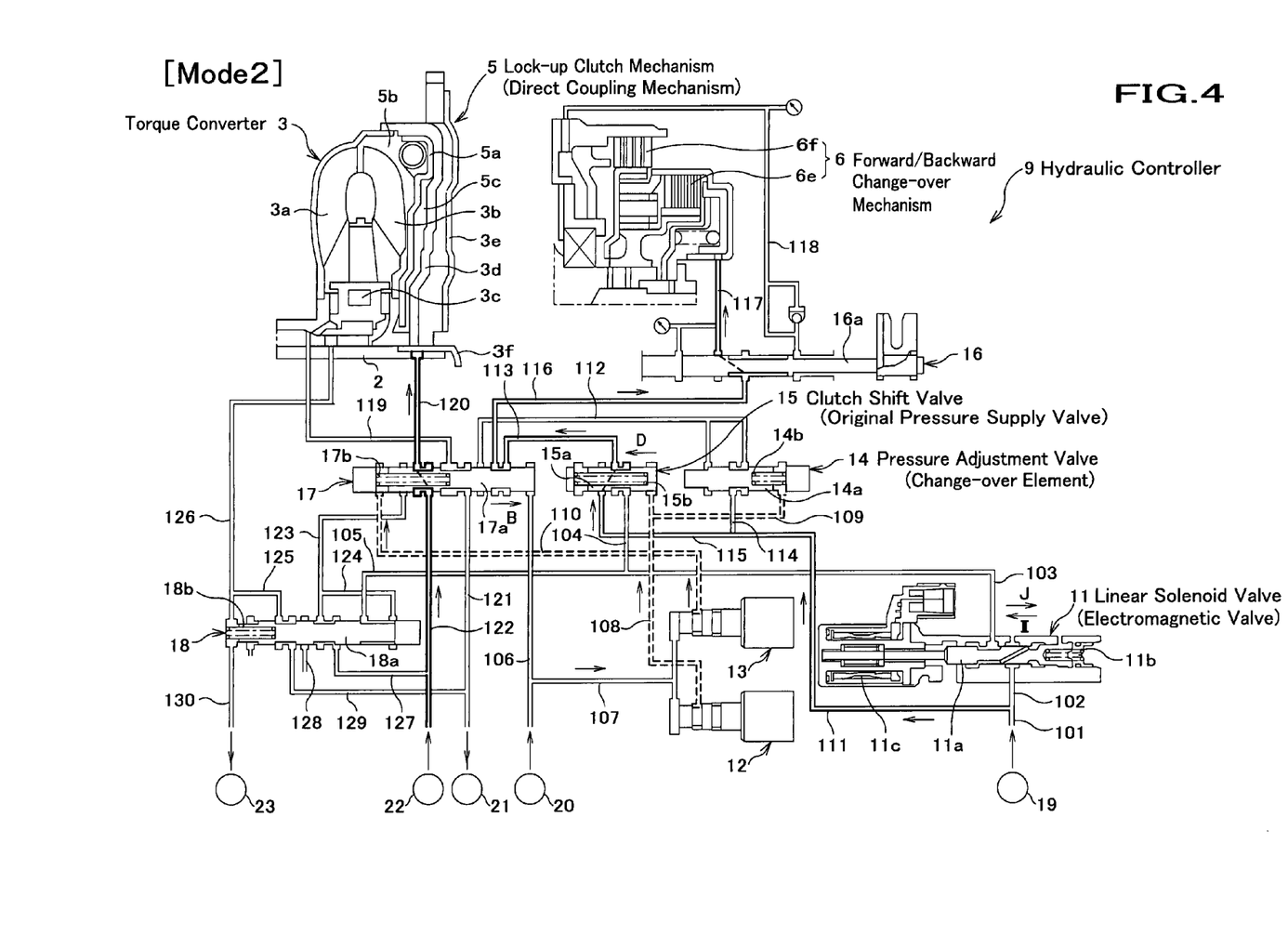
FIG. 4 is a drawing showing the hydraulic controller of the power transmission device related to the embodiment of the present invention and a hydraulic circuit diagram showing a state of a mode 2.

FIG. 4 is a drawing showing the hydraulic controller of the power transmission device related to the embodiment of the present invention and a hydraulic circuit diagram showing a state of the mode 2.

The mode 2 is in any state where operation states of the vehicle are acceleration driving and a kick-down. In the mode 2, as shown in FIG. 2, the first solenoid valve 12 is ON, the second solenoid valve 13 is also ON, the lock-up clutch mechanism 5 is OFF, and the forward/backward change-over mechanism 6 is in a state where the original pressure (CR) of a high pressure (for example, 16 kgf/cm² (1.6 MPa)) from the original pressure valve 19 is loaded.

In other words, in the mode 2, as shown in FIG. 4, the first solenoid valve 12 is ON, and the signal pressure of ON passes the oil passages 108 and 109 from the first solenoid valve 12 and is supplied to the pressure adjustment valve 14 and clutch shift valve 15.

Because the second solenoid valve 13 is ON, the signal pressure of ON is supplied to the lock-up shift valve 17 from the oil passage 110.

Therefore, the actuation pressure supplied from the regulator valve 22 passes the lock-up shift valve 17 from the oil passage 122, is supplied to the cover-side oil chamber 5c from the oil passage 120, the lock-up clutch piston 5a is pushed and thereby separated from the converter cover 3d, and the lock-up clutch mechanism 5 is in an OFF state of being released. At this time the torque converter 3 becomes a normal functional state.

Then to the clutch shift valve 15 is supplied the original pressure (CR) of the high pressure (for example, 16 kgf/cm² (1.6 MPa)) from the original pressure valve 19 through the oil passages 101, 111, and 115. Because the second solenoid valve 13 is ON and thereby the spool 17a of the lock-up shift valve 17 is in a state of having moved in the right direction of the arrow mark B, the original pressure (CR) is supplied to the manual valve 16 through the oil passage 113, the lock-up shift valve 17, and the oil passage 116. When in this state, for example, the shift lever (not shown) is in the forward direction such as the D range, the original pressure (CR) loaded on the manual valve 16 is loaded on the forward clutch 6e, thus it is completely engaged, and thereby acceleration driving and kick-down driving of the vehicle can be made.

Next will be described a mode 3, referring to FIGS. 2 and 5.

Figure 5:
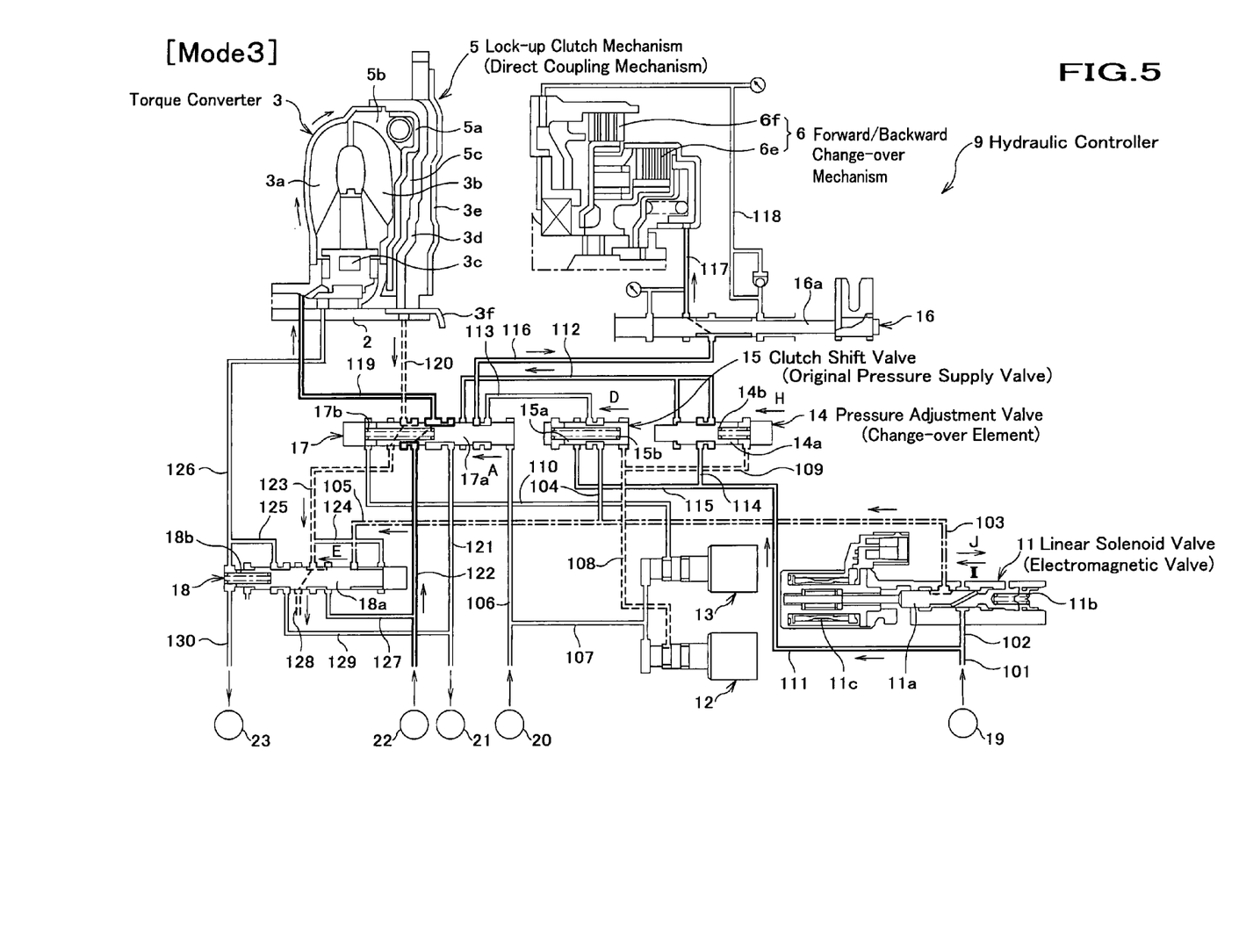
FIG. 5 is a drawing showing the hydraulic controller of the power transmission device related to the embodiment of the present invention and a hydraulic circuit diagram showing a state of a mode 3.

FIG. 5 is a drawing showing the hydraulic controller of the power transmission device related to the embodiment of the present invention and a hydraulic circuit diagram showing a state of the mode 3.

The mode 3 is in a state where an operation state of the vehicle is normal driving. As shown in FIG. 2, the mode 3 is in a state: the first solenoid valve 12 is ON, the second solenoid valve 13 is OFF, the lock-up clutch mechanism 5 is ON, and the original pressure (CR) of the high pressure (for example, 16 kgf/cm² (1.6 MPa)) from the original pressure valve 19 is loaded on the forward/backward change-over mechanism 6.

In other words, the mode 3, as shown in FIG. 5, the first solenoid valve 12 is ON, the signal pressure of ON passes the oil passages 108 and 109 from the first solenoid valve 12 and is supplied to an end of the pressure adjustment valve 14, and thereby a spool 14a is in a state of having moved in a left direction of an arrow mark H.

At this time the second solenoid valve 13 is OFF, the spool 17a of the lock-up shift valve 17 is located in the left direction of the arrow mark A, and thereby the oil passage 113 is in a state of having been closed.

Therefore, to the pressure adjustment valve 14 is supplied the original pressure (CR) of the high pressure (for example, 16 kgf/cm² (1.6 MPa)) from the original pressure valve 19 through the oil passages 101, 111, and 114. When the signal pressure of ON is loaded in the oil passage 109, the pressure adjustment valve 14 does not adjust the original pressure (CR) and supplies it to the manual valve 16 from the oil passage 112 in the high pressure state through the lock-up shift valve 17 and the oil passage 116. When in this state, for example, the shift lever (not shown) is in the forward direction such as the D range, the original pressure (CR) loaded on the manual valve 16 is loaded on the forward clutch 6e, thus it is completely engaged, and thereby the vehicle can normally be driven.

In addition, the actuation pressure from the regulator valve 22 is supplied to the lock-up shift valve 17 from the oil passage 122, passes the lock-up shift valve 17, is supplied to the turbine-side oil chamber 5b from the oil passage 119, and circulates in the torque converter 3.

Then hydraulic oil within the torque converter 3 passes from the cover-side oil chamber 5c, the oil passage 120, the lock-up shift valve 17, the oil passage 123, to the lock-up control valve 18 and is discharged from the oil passage 128. At this time a current is passed to the linear solenoid valve 11 from the electric control unit (not shown), a hydraulic pressure from the linear solenoid valve 11 is supplied to the oil passage 105 of the lock-up control valve 18, and thus an extraction amount of the hydraulic oil of the lock-up clutch mechanism 5 discharged from the oil passage 128 is adjusted.

Therefore, because a hydraulic pressure within the turbine-side oil chamber 5b becomes higher than that within the cover-side oil chamber 5c and the lock-up clutch piston 5a is energized toward a converter cover 3d side, the lock-up clutch piston 5a becomes a state of completely engaging the converter cover 3d.

Thus the lock-up clutch mechanism 5 becomes the ON state, that is, an engagement state suitable for the normal driving of the vehicle.

Meanwhile, a spool 18a moves in a left direction of an arrow mark E by a hydraulic pressure from the oil passage 105 of the lock-up control valve 18, and the more the move amount is, the stronger the engagement of the lock-up clutch mechanism 5 becomes.

Thus, when an vehicle of the mode 3 is in the normal driving state, any of the forward clutch 6e and backward brake 6f of the forward/backward change-over mechanism 6 is completely engaged, and the engagement capacity of the lock-up clutch mechanism 5 (engagement capacity of the lock-up clutch piston 5a and the converter cover 3d) is in a state of being adjusted.

Next will be described an operation of a mode 4, referring to FIGS. 2 and 6.

Figure 6:
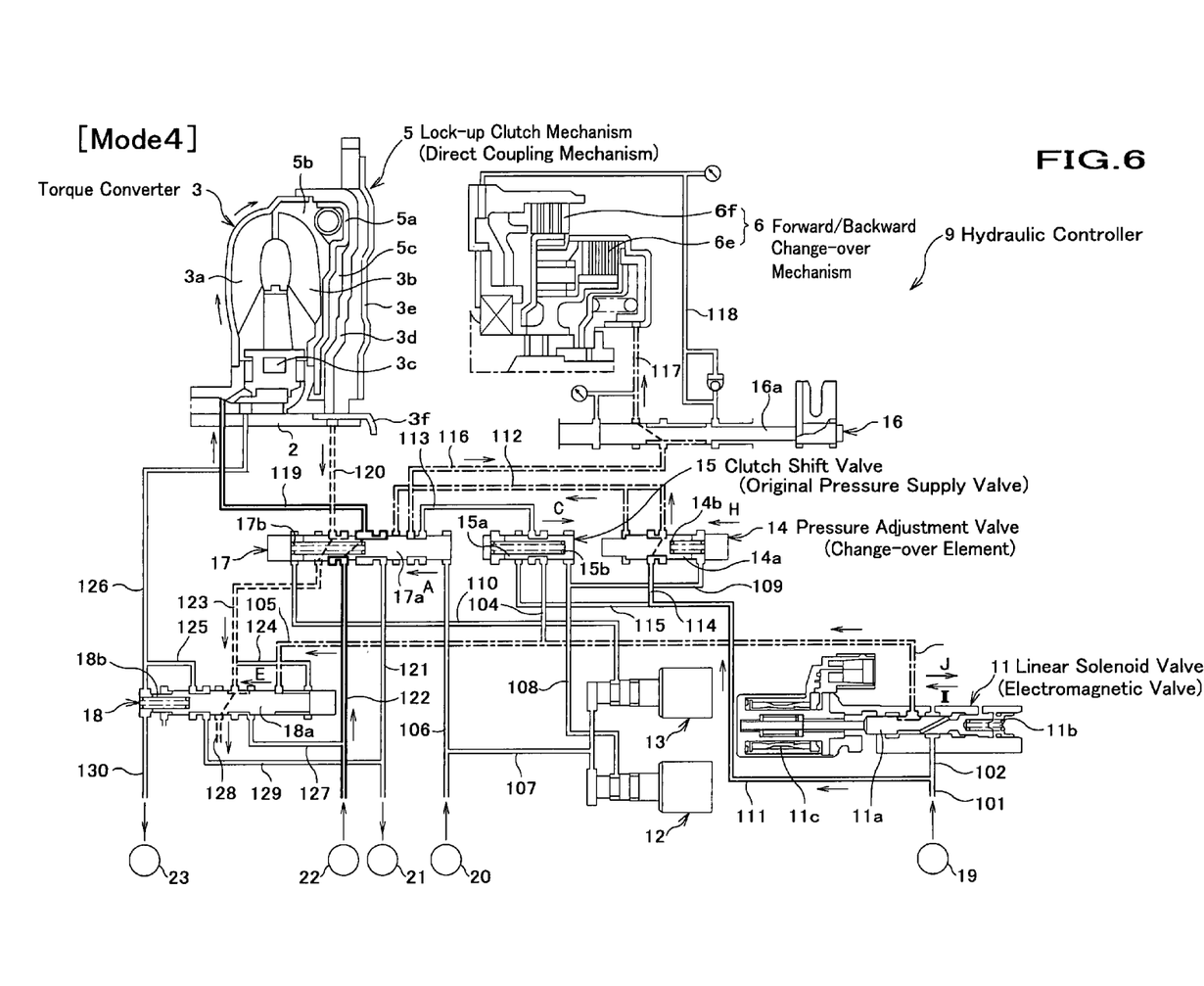
FIG. 6 is a drawing showing the hydraulic controller of the power transmission device related to the embodiment of the present invention and a hydraulic circuit diagram showing a state of a mode 4.

FIG. 6 is a drawing showing the hydraulic controller of the power transmission device related to the embodiment of the present invention and a hydraulic circuit diagram showing a state of the mode 4.

The mode 4 is in a state where an operation state of the vehicle is deceleration driving. As shown in FIG. 2, the mode 4 is in a state: the first solenoid valve 12 is OFF, the second solenoid valve 13 is also OFF, the lock-up clutch mechanism 5 is ON, and a control pressure (CL) of a low pressure (for example, 4 kgf/cm$^2$ (0.4 MPa)) from the pressure adjustment valve 14 is loaded on the forward/backward change-over mechanism 6.

In other words, the mode 4, as shown in FIG. 6, the first solenoid valve 12 is OFF, the signal pressure of ON does not pass the oil passages 108 and 109 from the first solenoid valve 12 and thereby is not supplied to the pressure adjustment valve 14 and the clutch shift valve 15. Therefore, a spool 15a is in a state of having moved in a right direction of an arrow mark C with being energized by a spring 15b and thereby makes a state where the original pressure (CR) is loaded on the forward/backward change-over mechanism 6 through the pressure adjustment valve 14.

Therefore, to the pressure adjustment valve 14 is supplied the original pressure (CR) of the high pressure (for example, 16 kgf/cm$^2$ (1.6 MPa)) from the original pressure valve 19 through the oil passages 101, 111, and 114. When the second solenoid valve 13 is OFF and the signal pressure of ON is not supplied to the oil passage 109, the pressure adjustment valve 14 adjusts it low a hydraulic pressure of hydraulic oil entered from the oil passage 114 by elasticity of the spring 14b. Accordingly, the original pressure (CR) is converted to the control pressure (CL) of the low pressure (for example, 4 kgf/cm$^2$ (0.4 MPa)) by the pressure adjustment valve 14 and then supplied to the manual valve 16 through the oil passage 112, the lock-up shift valve 17, and the oil passage 116. When in this state, for example, the shift lever (not shown) is in the forward direction such as the D range, the control pressure (CL) of the low pressure loaded on the manual valve 16 is loaded on the forward clutch 6e, thus it is engaged in a weak state, and thereby a smooth engagement state without a transmission shock can be made.

On the other hand, because the second solenoid valve 13 is OFF, the signal pressure of ON is not supplied to the lock-up shift valve 17 from the oil passage 110. Therefore, the spool 17a is in a state of having moved in the left direction of the arrow mark A by a hydraulic pressure of the oil passage 106 and makes the lock-up clutch mechanism 5 the ON state.

Therefore, the actuation pressure from the regulator valve 22 is supplied to the lock-up shift valve 17 through the oil passage 122, passes the lock-up shift valve 17, is supplied to the turbine-side oil chamber 5b from the oil passage 119, and circulates in the torque converter 3.

Then hydraulic oil within the torque converter 3 passes from the cover-side oil chamber 5c, the oil passage 120, the lock-up shift valve 17, the oil passage 123, to the lock-up control valve 18 and is discharged from the oil passage 128. At this time a current is passed to the linear solenoid valve 11 from the electric control unit (not shown), the control pressure (CPC) from the linear solenoid valve 11 is supplied to the oil passage 105 of the lock-up control valve 18, and thus an extraction amount of the hydraulic oil of the lock-up clutch mechanism 5 discharged from the oil passage 128 is adjusted.

Therefore, because a hydraulic pressure within the cover-side oil chamber 5c becomes higher than that within the turbine-side oil chamber 5b and the lock-up clutch piston 5a is energized toward a turbine runner 3b side, the lock-up clutch piston 5a becomes an ON state of incompletely engaging the converter cover 3d.

Thus an engagement strength of the lock-up clutch mechanism 5 is adjusted and becomes an engagement state suitable for the vehicle implementing deceleration driving with an engine brake.

Thus a state of the deceleration driving of the vehicle of the mode 4 is in a creep state where the forward/backward change-over mechanism 6 (any of engagement capacities of the forward clutch 6e and the backward brake 6f) and the lock-up clutch mechanism 5 (any of engagement capacities of the lock-up clutch piston 5a and the converter cover 3d) are both adjusted, loosely engaged, and thereby slip.

For example, in a state where a panic brake is actuated during an engine brake of a vehicle and wheels are locked, it brings out a fuse-like function of absorbing a transmission shock, eliminating an impact received by the continuously variable transmission device CVT, and thus protecting the V belt 7i (see FIG. 1) to implement control by a smooth engagement where the forward/backward change-over mechanism 6 slips.

Thus the hydraulic controller of the power transmission device controls a hydraulic pressure supplied to the forward/backward change-over mechanism 6 to the original pressure (CR), the control pressure (CPC), and the control pressure (CL) of a low pressure by one linear solenoid valve 11 and the pressure adjustment valve 14; and adjusts the engagement capacities of the forward clutch 6e and backward brake 6f of the forward/backward change-over mechanism 6. Therefore, because the hydraulic controller 9 comprises the comparatively expensive linear solenoid valve 11 and does not require two linear solenoid valves, cost can be reduced.

Because the hydraulic controller 9 provides the pressure adjustment valve 14 for making the hydraulic pressure supplied to the forward/backward change-over mechanism 6 a lower pressure than the original pressure (CR), it can be made to adjust the engagement capacities of the forward clutch 6e and backward brake 6f of the forward/backward change-over mechanism 6 and thereby make a weak engagement state. Thus the forward/backward change-over mechanism 6 can implement adequate engagement control, depending on driving state of a vehicle.

Accordingly, because when a panic brake is actuated during an engine brake and an engine rotation is low one such as having a fear of causing a stall, the forward/backward change-over mechanism 6 can adjust the engagement capacities of the forward clutch 6e and backward brake 6f and make the weak engagement state, it can be made to implement the smooth engagement control without a transmission shock.

Meanwhile, the present invention is not limited to the embodiment, various remodeling and variations are available without departing from the spirit and scope of the invention, and it goes without saying that the invention covers these remodeling and variations.

What is claimed is:

1. A hydraulic controller of a power transmission device comprising:
   a transmission for changing a rotation speed of motor power input from a motor and outputting the motor power;
   a forward/backward change-over mechanism provided between an input shaft, where the motor power of said motor is input, and said transmission; and
   a torque converter having a direct coupling mechanism for transmitting the motor power between an output shaft and said input shaft of said motor;
   a solenoid valve for adjusting an original pressure and generating a control pressure; and
   a change-over element for changing over a hydraulic pressure supplied to the forward/backward change-over mechanism so as to become a low pressure during deceleration driving when said direct coupling mechanism is controlled by said solenoid valve,
   wherein any one of engagement states of said forward/backward change-over mechanism and said direct coupling mechanism is controlled by said control pressure.

* * * * *